Patented Mar. 6, 1928.

1,661,201

UNITED STATES PATENT OFFICE.

ERNST STERN, OF CHARLOTTENBURG, GERMANY.

PROCESS OF MAKING STARCH PRODUCTS.

No Drawing. Application filed March 20, 1926, Serial No. 96,331, and in Germany August 5, 1924.

This invention relates to a process of making starch products, particularly dry starch products, while avoiding cumbrous drying processes and attaining a product of high value. The invention further relates to starch products and dry starch products made according to the improved process.

With the conventional processes of making dry starch products it is necessary to make a paste of the suitably pre-treated starch and then to dry the same on hot cylinders or plates by means of a suitable drying process.

If, for instance, soluble dry starch products are gained from alkaline starch, as is generally the case, said drying processes are very difficult and expensive, because the particular nature of the alkaline starches requires first to remove therefrom considerable quantities of water by a cumbersome process, generally on cylinder drying apparatus.

By the improved process forming the subject matter of the present invention, swellable starches are produced, the drying process of the dry starch product being considerably simplified or dispensed with.

According to the invention a composition of the starch with a compound of alkaline earths is employed, that is capable of precipitating the starch composition in water. Said starch composition is mixed with at least one additional agent consisting of anionic and cathionic ingredients and soluble in water, while at least one of the ingredients is capable of forming with the starch a starch composition soluble in water.

In the preferred forms of carrying the improved process into practice, another ingredient of the named additional agent may then form a composition that precipitates in water with an ingredient of that compound of alkine earth which formed with the starch a composition precipitated in water.

For carrying out the improved process, mainly compositions of the starch with such hydroxides of metal are used, which precipitate the starch in the solvent, that is a composition insoluble or difficultly soluble in a solvent, preferably water.

The starch compositions being precipitated in water may be recovered with a small amount of moisture simply by sifting them. The drying process may be avoided entirely, either, by throwing-off the precipitate still moist, or, by removing the last moisture from the precipitate by drying it in the open air or on racks; this being impossible with alkaline starches. It is immaterial for the improved process whether said composition or compound of the starch with the ingredient which precipitates it in water, be a chemical compound, a colloid, an adsorption product, or a mixture.

The product dried in one or the other way is then, according to the invention, mixed with an additional agent consisting of anionic and cathionic ingredients, predominantly with a salt soluble in water, the cathionic ingredient of which, as soon as water is added, decomposes the starch composition and forms with the starch a new starch composition soluble in water, while in the preferred forms of carrying out the improved process the anionic ingredient of the salt forms with the cathionic ingredient of the medium precipitating the starch a composition precipitated in water.

The dry mixture of the starch composition insoluble in water and the additional agent for decomposing and rendering soluble the starch composition may be brought into trade in the conventional packages without any risk of the product becoming deteriorated during long storage.

The conversion of the dry starch into a swellable starch is extremely simple, inasmuch as it is only necessary to add a solvent thereto, preferably water.

For carrying the invention into practice, the compositions of the starch with hydroxides of metal, particularly the compositions of the starch with alkaline earths such as barium, calcium, strontium, magnesium, or zinc, are of value, while the hydroxides of the earths, preferably aluminium, or the hydroxides of heavy metal such as iron or copper, can be employed too.

Under the circumstances, double starch compositions insoluble in water may be taken into consideration, that is, compositions of the starch with hydroxides of a metal of a strongly basic character are precipitated together with hydroxides of metal of a weaker basic character. This has, inter alia, the advantage that the precipitation of the composition of the starch with the weakly basic hydroxide is favoured by the composition with the strongly basic hydroxide, so that combined precipitates of valuable qualities are gained.

If, for instance, barium aluminum starch or barium magnesium starch or barium iron starch or barium copper starch is produced, the metal is included in these starches at least in part in the form of its hydroxides. If such double metal starches are then mixed with a sulphate, such as sodium sulphate, and treated with water, the sodium sulphate is decomposed so that on the one hand alkaline starch and on the other hand barium sulphate are formed. But at the same time, the beforenamed metal hydroxides, which formerly constituted an additional ingredient of the starch composition, such as aluminum or magnesium or the hydroxides of heavy metals such as iron or copper, dispose themselves in extremely fine distribution on the barium sulphate and within the intercellular spaces of the colloidal alkaline starch.

Hence result swellable starches of valuable technical qualities, as in said starches, according to the combination of hydroxides of metals employed, certain qualities of the metal or of its salts or of its cathions can be attained; that is for instance products of certain colours such as pure white, or green, blue, or red may be got.

Furthermore, the starch products produced show qualities of great value they may have disinfecting qualities (e. g. copper starch) or other qualities of value for their technical use, so that, for instance, they may be employed for painters' glue, paste, or carpenters' or joiners' glue, or for other purposes.

The compositions: barium magnesium starch and barium aluminum starch are particularly distinguished by their high swelling capacities.

The processes for drying the starch compositions precipitated from the solvent may be of various kinds. In any case, for drying, simple technical measures only are required of comparatively small expenditure of energy.

A valuable modification is attained by exposing the starch composition, particularly the barium composition, after its precipitation, to an atmosphere of carbonic acid, for instance during the drying process or before it, in the latter case drying it say to at least a moisture content of 25%. Part of the barium combined with the starch composition is thereby converted to carbonate of barium and frees on the one hand the amount of moisture enclosed so that the drying is promoted, while on the other hand, corresponding to the conversion of part of the barium to carbonate of barium, the quantity of the additional agent, particularly of the additional salt to be admixed to the precipitated starch composition, can be reduced.

For carrying the invention into practice, most kinds of starch may be used with success such as potato starch, cassava starch, tapioca starch, maize starch, wheat starch, rice starch, or the like.

The following examples may serve to further explain the essence of the invention:—

Example I.

72 kgs. of potato flour are stirred with 140–150 kgs. of water to form a paste, which is disintegrated by an addition a soluble base, such as an alkaline base, for instance of 15 kgs. of a caustic soda solution of 30%, to form then a clear starch solution completely free of lumps. This disintegration being carried further 15–20 kgs. of water are added, whereupon with a continuous stirring of the mixture 120 kgs. of a solution of barium chloride containing in 100 parts thereof 20 parts of crystallized barium chloride ($BaCl_2$—$2H_2O$), are gradually added. The barium starch is precipitated as a white, perfectly insoluble precipitate, which quickly settles to the bottom and can easily be purified by decantation. The precipitate is then brought onto sieves for draining from it the water superficially adhering to it.

In this condition the precipitate consists of about 60% of barium starch with an average amount of 9% of BaO. The further treatment can be effected in different ways:

(a) The barium starch is broken into pieces in an appropriate apparatus and dried until its amount of moisture is reduced to about 20–25%. In this condition, the barium starch is of crumby quality but perfectly unswellable. If, then, to 100 parts thereof 10–15 parts of sodium sulphate free of water are added, a highly concentrated, portable product is gained that, with an addition of water, gives a swellable material.

(b) The barium starch is dried until perfectly dry crusts are obtained that can be easily ground. By an addition of 15–20% of sodium sulphate to the ground barium starch, a powder is gained that, when mixed with ten times its volume of water, after conversion gives a swellable product containing 14–15% of barium sulphate in finest distribution.

Example II.

The process may, in a similar way, also be carried out by replacing the barium starch by calcium starch and effecting the precipitation of the alkaline starch solution, instead of by a barium chloride solution of 20%, by a calcium chloride solution of 20%. The further treatment of the product is not essentially distinguished from that indicated in the Example I, though it may be expedient, for converting the calcium starch, to use sodium phosphate instead of sodium sulphate.

The reactions during these conversions may, for instance, be represented as follows, the vertical arrows indicating that the material immediately preceding it precipitates:—

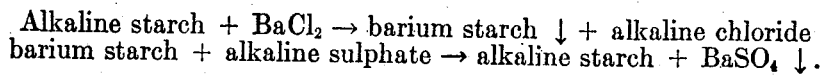

Alkaline starch + BaCl$_2$ → barium starch ↓ + alkaline chloride
barium starch + alkaline sulphate → alkaline starch + BaSO$_4$ ↓.

The process can, in a corresponding way, be carried out with the salts of other alkaline earths or mixtures thereof, such as with the salts of strontium, calcium, beryllium, and magnesium.

*Example III.*

24 kgs. of starch are mixed with 48 kgs. of water and dissolved by an addition of 6 kgs. of a caustic soda solution of 30%, the solution being brought by water to a final weight of 120 kgs.

(a) 10 kgs. of this starch solution are precipitated by a solution of salt containing 3500 ccm. of a solution of barium chloride of 20% and 250 ccm. of a solution of zinc chloride (136 gr. zinc chloride in 1 kg. of water). A barium zinc precipitate is obtained that is treated as described in the Example I. The swelled product contains oxide of zinc in finest distribution.

(b) 10 kgs. of starch solution are treated with a salt solution composed of 3500 ccm. of a solution of barium chloride of 20% and 250 or 500 ccm. of a solution of ferric chloride (180 gr. ferric chloride in 1 kg. of water). A combined barium iron starch precipitate is obtained that is treated in a similar way as the pure barium starch and distinguishes itself by a beautiful red-brown colour.

(c) 10 kgs. of a starch solution are treated with 3500 ccm. of a barium chloride solution with an addition of 100 or 250 ccm. of a solution of aluminium chloride (90 gr. of AlCl$_3$ in 1 kg. of water). A barium aluminum starch of high swelling capacity is gained which is able to bind organic pigments to lac colours. In a similar way, the combined barium copper precipitates and the combined barium magnesium precipitates may be produced.

In some cases, the process may be supplemented by adding to the mixture ready for reaction a soluble alkaline soap, for instance 5%, which envelopes the small particles of the metal starch at the moment the soap dissolves in water, thus forming an emulsion which is easily wetted so that the surface tension or capillarity is lowered and a quicker and a more uniform swelling results.

*Example IV.*

In some cases, particularly when producing combined precipitates, the starch precipitate is first formed in a somewhat swollen form. This applies, for instance, to barium aluminum precipitates of higher contents of aluminum. In such cases it may be advantageous to promote the precipitation by an addition of some alcohol, the precipitates being thereby settled in a quicker and easier way. This mode of proceeding is advantageous too when used with the compositions of the starch with earths, for instance with aluminum alone.

In these and similar processes for producing a dissolved starch ready for use, a starch product is employed that consists of a composition of a starch with a medium, the starch composition being precipitated from a solvent. To this starch composition an additional agent is admixed consisting of several ingredients of which one is capable of forming with the starch a starch composition soluble in the named solvent while at least another ingredient of the named additional agent is capable of forming with the first-named medium a composition insoluble in the solvent.

As a composition of the starch, a metal starch is used that is at least difficultly soluble in the solvent, preferably water, and preferably mixed with an alkaline salt soluble in the solvent, said alkaline salt with an addition of water being capable of decomposing the metal starch the cathionic ingredient or the alkali of the salt forming with the starch an alkaline starch soluble in water and the anionic ingredient or the acid anion of the salt being capable of forming with the metal of the starch a composition at least difficultly soluble in the solvent or water.

The processes described result then for instance in dry starch products consisting of at least 100 parts of alkaline earth starch of at least 8 parts of earth oxide and mixed with at least 10 parts of an alkaline salt free of water. As an alkaline earth starch, barium starch of at least 8 parts of barium oxide may be used mixed with, for instance, 10 parts of sodium sulphate free of water. The dry product ready for use may also contain a multiple metal starch consisting, for instance, of 100 parts of alkaline earth heavy metal starch (for instance, barium zinc starch) (or barium copper starch) of at least 8 parts of alkaline earth oxide (for instance barium oxide) and of at least 3 parts of heavy metal oxide (for instance, zinc oxide or copper oxide), this metal starch being mixed with at least 10 parts of an alkaline salt free of water such as, for instance, sodium sulphate, or sodium phosphate, or potassium sulphate or sodium carbonate, or the like.

I do not only claim the process of making starch products, particularly dry starch products, but I claim too the dry starch products themselves, and I further do not wish to limit my claim to the examples above described and hereinafter claimed, as there are many other examples lying within the scope of my invention and which are readily apparent to anyone skilled in the art.

What I claim is:

1. A process consisting in that a composition of starch and of a compound of alkaline earths capable of precipitating the composition in water is mixed with at least one additional agent of salt character consisting of anionic and cathionic ingredients and soluble in water, at least one of the ingredients named being capable of forming with the starch a starch composition soluble in the solvent named.

2. A process consisting in that a composition of starch and of a compound of alkaline earths capable of precipitating the composition in water is mixed with at least one additional agent of salt character consisting of anionic and cathionic ingredients and soluble in water, at least one of the ingredients named being capable of forming with the starch a starch composition soluble in the solvent named and furthermore at least another ingredient of the named additional agent being capable of forming a composition being precipitated in the solvent with an ingredient of said compound of alkaline earth.

3. A process consisting in that a composition of starch, and of at least a metal capable of precipitating the composition in water is mixed with at least an additional agent of a salt character soluble in water, a cathionic ingredient of said salt being capable of forming with the starch a starch composition soluble in water.

4. A process consisting in that a composition of starch and of at least a metal capable of precipitating the composition in water is mixed with at least a salt soluble in water, the cathionic ingredient of said salt being capable of forming with the starch a starch composition soluble in water and furthermore an anionic ingredient of said salt being capable of forming a composition with the cathionic ingredient of the named composition of starch.

5. A process consisting in that a composition of starch and of at least a metal capable of precipitating the composition in a solvent is mixed with at least a salt soluble in the solvent named, a cathionic ingredient of said salt being capable of forming with the starch a starch composition soluble in the solvent named and furthermore an anionic ingredient of said salt being capable of forming with the cathionic ingredient of the named composition of starch a composition being precipitated in the solvent.

6. A process consisting in that a composition of starch and of at least a metal capable of precipitating the composition in a solvent is mixed with at least a salt soluble in the solvent named, a cathionic ingredient of said salt being capable of forming with the starch a starch composition soluble in the solvent named and furthermore an anionic ingredient of said salt being capable of forming with a cathionic ingredient of the named composition of starch a composition being precipitated in the solvent and giving a colored character to the starch solution.

7. A process consisting in that a composition of starch and of at least a metal of at least weakly basic character capable of precipitating the named composition in a solvent, is mixed with at least a salt soluble in the named solvent, a cathionic ingredient of said salt being capable of forming with the starch a starch composition soluble in the named solvent.

8. A process consisting in precipitating a starch disintegrated with the aid of an alkaline base, by a salt of an alkaline earth metal, separating the precipitate, drying the same, and mixing it with at least an alkaline salt, the cathionic ingredient of said alkaline salt being capable of forming with the starch a composition soluble in the solvent and furthermore the anionic ingredient of said alkaline salt being capable of forming with the alkaline earth metal of the first-named salt a salt insoluble in the solvent.

9. A process consisting in that a starch disintegrated with the aid of an alkaline base is precipitated by a salt of an alkaline earth metal and at the same time by a salt of a heavy metal, separating the precipitate, drying the same, and mixing it with at least an alkaline salt, the cathionic ingredient of said alkaline salt being capable of forming with the starch a composition soluble in the solvent and furthermore the anionic ingredient of said alkaline salt being capable of forming at least with the alkaline earth metal of the first-named salt a salt insoluble in the solvent.

10. A process consisting in stirring potato flour with water to form a dough, then disintegrating it by a caustic soda solution to form a starch solution, adding to the latter a solution containing barium chloride, separating the barium starch precipitated from the solution, drying the same to at least an amount of moisture of 25%, and mixing it with sodium sulphate.

11. A process consisting in stirring potato flour with water to form a dough, then disintegrating it by a caustic soda solution to form a starch solution, adding to the latter a solution containing barium chloride and zinc chloride separating the barium zinc starch precipitated from the solution, drying the same to at least an amount of moisture of 25%, and mixing it with sodium sulphate.

12. A process consisting in stirring potato flour with water to form a dough, then disintegrating it by a caustic soda solution to form a starch solution, adding to the latter a solution containing barium chloride, separating the barium starch precipitated from the solution, drying the same to at least an amount of moisture of 25%, mixing it with sodium sulphate, and mixing thereto water for its use as a starch solution.

13. A process consisting in that a composition of starch and of at least a hydroxide of metal capable of precipitating the composition in a solvent is mixed with soap and with at least a salt soluble in the named solvent, the metal of the salt being capable of forming with the starch a starch composition soluble in the named solvent and furthermore the acid rest of the salt being capable of forming a composition with the metal of the named hydroxide of metal.

14. A starch product insoluble in water consisting of a composition of starch with a compound of alkaline earths, and of an additional agent of salt character composed of anionic and cathionic ingredients, at least one of the latter capable of forming with the starch a starch composition soluble in water.

15. A starch product insoluble in water consisting of a composition of starch with a compound of alkaline earths, and of an additional agent of salt character composed of anionic and cathionic ingredients, at least one of the latter capable of forming with the starch a starch composition soluble in water, and at least another ingredient of the named additional agent capable of forming with said medium a composition insoluble in the solvent.

16. A starch product consisting of a metal starch at least difficultly soluble in water, and of an alkaline salt soluble in water, said salt capable with an addition of water of decomposing the metal starch, the alkali of said salt capable of forming with the starch an alkaline starch soluble in water, and the anion of said salt capable of forming with the metal of the starch a composition at least difficultly soluble in water.

17. A starch product consisting of a metal starch at least difficultly soluble in water, and of an alkaline salt soluble in water, said salt capable with an addition of water of decomposing the metal starch, the alkali of said salt capable of forming with the starch an alkaline starch soluble in water, and the anion of said salt capable of forming with the metal of the starch a composition at least difficultly soluble in water and coloring the final product of the starch.

18. A dry starch product comprising at least 100 parts of alkaline earth starch of at least 8 parts of alkaline earth oxide and in at least 10 parts of an alkaline salt free of water, said alkaline salt being composed of anionic and cathionic ingredients and soluble in water, at least one of the ingredients named being capable of forming with the starch a starch composition soluble in water.

19. A dry starch product consisting in at least 100 parts of alkaline earth starch of at least 8 parts of alkaline earth oxide, and in 5 parts of dry soap and in at least 10 parts of an alkaline salt free of water, said alkaline salt being composed of anionic and cathionic ingredients and soluble in water, at least one of the ingredients named being capable of forming with the starch a starch composition soluble in water.

20. A dry starch product comprising at least 100 parts of barium starch of at least 8 parts of barium oxide, and in at least 10 parts of sodium sulphate free of water.

21. A dry starch product consisting in at least 100 parts of alkaline earth heavy metal starch of at least 8 parts of alkaline earth oxide and of at least 3 parts of heavy metal oxide, and in at least 10 parts of an alkaline salt free of water, said alkaline salt being composed of anionic and cathionic ingredients and soluble in water, at least one of the ingredients named being capable of forming with the starch a starch composition soluble in water.

22. A dry starch product consisting in at least 100 parts of barium zinc starch of at least 8 parts of barium oxide and of at least 3 parts of zinc oxide, and in at least 10 parts of sodium sulphate free of water.

In testimony whereof I have hereunto set my hand.

ERNST STERN.